(12) United States Patent
Gaddam et al.

(10) Patent No.: US 10,164,996 B2
(45) Date of Patent: Dec. 25, 2018

(54) METHODS AND SYSTEMS FOR PROVIDING A LOW VALUE TOKEN BUFFER

(71) Applicant: Visa International Service Association, San Francisco, CA (US)

(72) Inventors: Ajit Gaddam, Sunnyvale, CA (US); Selim Aissi, Menlo Park, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 239 days.

(21) Appl. No.: 15/066,359

(22) Filed: Mar. 10, 2016

(65) Prior Publication Data

US 2016/0269391 A1 Sep. 15, 2016

Related U.S. Application Data

(60) Provisional application No. 62/132,499, filed on Mar. 12, 2015.

(51) Int. Cl.
*H04L 29/00* (2006.01)
*H04L 29/06* (2006.01)

(52) U.S. Cl.
CPC ...... *H04L 63/1433* (2013.01); *H04L 63/0807* (2013.01)

(58) Field of Classification Search
CPC ... H04L 63/10; H04L 63/0884; H04L 63/107; H04L 63/08; H04L 63/0823
See application file for complete search history.

(56) References Cited

U.S. PATENT DOCUMENTS

| | | |
|---|---|---|
| 5,613,012 A | 3/1997 | Hoffman |
| 5,781,438 A | 7/1998 | Lee |
| 5,883,810 A | 3/1999 | Franklin |

(Continued)

FOREIGN PATENT DOCUMENTS

| | | |
|---|---|---|
| EP | 2156397 A1 | 2/2010 |
| WO | 2001035304 A1 | 5/2001 |

(Continued)

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

(Continued)

*Primary Examiner* — Ghazal B Shehni
(74) *Attorney, Agent, or Firm* — Kilpatrick Townsend Stockton LLP

(57) ABSTRACT

Embodiments of the present invention are directed at methods and systems for providing a low value token buffer using only low value tokens (i.e., tokens that cannot be used to conduct transactions) within an organization to reduce access to high value tokens (i.e., tokens that are directly tied to real credentials and can be used to conduct transactions) within the organization. Accordingly, whenever a high value token is received by the organization, the high value token is changed to a low value token while being used within the organization. The low value token may be transformed to high value token upon (or before) delivery outside the organization.

16 Claims, 6 Drawing Sheets

100

(56) References Cited

U.S. PATENT DOCUMENTS

| | | | |
|---|---|---|---|
| 5,953,710 | A | 9/1999 | Fleming |
| 5,956,699 | A | 9/1999 | Wong |
| 6,000,832 | A | 12/1999 | Franklin |
| 6,014,635 | A | 1/2000 | Harris |
| 6,044,360 | A | 3/2000 | Picciallo |
| 6,163,771 | A | 12/2000 | Walker |
| 6,227,447 | B1 | 5/2001 | Campisano |
| 6,236,981 | B1 | 5/2001 | Hill |
| 6,267,292 | B1 | 7/2001 | Walker |
| 6,327,578 | B1 | 12/2001 | Linehan |
| 6,341,724 | B2 | 1/2002 | Campisano |
| 6,385,596 | B1 | 5/2002 | Wiser |
| 6,422,462 | B1 | 7/2002 | Cohen |
| 6,425,523 | B1 | 7/2002 | Shem Ur |
| 6,592,044 | B1 | 7/2003 | Wong |
| 6,636,833 | B1 | 10/2003 | Flitcroft |
| 6,748,367 | B1 | 6/2004 | Lee |
| 6,805,287 | B2 | 10/2004 | Bishop |
| 6,879,965 | B2 | 4/2005 | Fung |
| 6,891,953 | B1 | 5/2005 | DeMello |
| 6,901,387 | B2 | 5/2005 | Wells |
| 6,931,382 | B2 | 8/2005 | Laage |
| 6,938,019 | B1 | 8/2005 | Uzo |
| 6,941,285 | B2 | 9/2005 | Sarcanin |
| 6,980,670 | B1 | 12/2005 | Hoffman |
| 6,990,470 | B2 | 1/2006 | Hogan |
| 6,991,157 | B2 | 1/2006 | Bishop |
| 7,051,929 | B2 | 5/2006 | Li |
| 7,069,249 | B2 | 6/2006 | Stolfo |
| 7,103,576 | B2 | 9/2006 | Mann, III |
| 7,113,930 | B2 | 9/2006 | Eccles |
| 7,136,835 | B1 | 11/2006 | Flitcroft |
| 7,177,835 | B1 | 2/2007 | Walker |
| 7,177,848 | B2 | 2/2007 | Hogan |
| 7,194,437 | B1 | 3/2007 | Britto |
| 7,209,561 | B1 | 4/2007 | Shankar et al. |
| 7,264,154 | B2 | 9/2007 | Harris |
| 7,287,692 | B1 | 10/2007 | Patel |
| 7,292,999 | B2 | 11/2007 | Hobson |
| 7,350,230 | B2 | 3/2008 | Forrest |
| 7,353,382 | B2 | 4/2008 | Labrou |
| 7,379,919 | B2 | 5/2008 | Hogan |
| RE40,444 | E | 7/2008 | Linehan |
| 7,415,443 | B2 | 8/2008 | Hobson |
| 7,444,676 | B1 | 10/2008 | Asghari-Kamrani |
| 7,469,151 | B2 | 12/2008 | Khan |
| 7,548,889 | B2 | 6/2009 | Bhambri |
| 7,567,934 | B2 | 7/2009 | Flitcroft |
| 7,567,936 | B1 | 7/2009 | Peckover |
| 7,571,139 | B1 | 8/2009 | Giordano |
| 7,571,142 | B1 | 8/2009 | Flitcroft |
| 7,580,898 | B2 | 8/2009 | Brown |
| 7,584,153 | B2 | 9/2009 | Brown |
| 7,593,896 | B1 | 9/2009 | Flitcroft |
| 7,606,560 | B2 | 10/2009 | Labrou |
| 7,627,531 | B2 | 12/2009 | Breck |
| 7,627,895 | B2 | 12/2009 | Gifford |
| 7,650,314 | B1 | 1/2010 | Saunders |
| 7,685,037 | B2 | 3/2010 | Reiners |
| 7,702,578 | B2 | 4/2010 | Fung |
| 7,707,120 | B2 | 4/2010 | Dominguez |
| 7,712,655 | B2 | 5/2010 | Wong |
| 7,734,527 | B2 | 6/2010 | Uzo |
| 7,753,265 | B2 | 7/2010 | Harris |
| 7,770,789 | B2 | 8/2010 | Oder, II |
| 7,784,685 | B1 | 8/2010 | Hopkins, III |
| 7,793,851 | B2 | 9/2010 | Mullen |
| 7,801,826 | B2 | 9/2010 | Labrou |
| 7,805,376 | B2 | 9/2010 | Smith |
| 7,805,378 | B2 | 9/2010 | Berardi |
| 7,818,264 | B2 | 10/2010 | Hammad |
| 7,828,220 | B2 | 11/2010 | Mullen |
| 7,835,960 | B2 | 11/2010 | Breck |
| 7,841,523 | B2 | 11/2010 | Oder, II |
| 7,841,539 | B2 | 11/2010 | Hewton |
| 7,844,550 | B2 | 11/2010 | Walker |
| 7,848,980 | B2 | 12/2010 | Carlson |
| 7,849,020 | B2 | 12/2010 | Johnson |
| 7,853,529 | B1 | 12/2010 | Walker |
| 7,853,995 | B2 | 12/2010 | Chow |
| 7,865,414 | B2 | 1/2011 | Fung |
| 7,873,579 | B2 | 1/2011 | Hobson |
| 7,873,580 | B2 | 1/2011 | Hobson |
| 7,890,393 | B2 | 2/2011 | Talbert |
| 7,891,563 | B2 | 2/2011 | Oder, II |
| 7,896,238 | B2 | 3/2011 | Fein |
| 7,908,216 | B1 | 3/2011 | Davis et al. |
| 7,922,082 | B2 | 4/2011 | Muscato |
| 7,931,195 | B2 | 4/2011 | Mullen |
| 7,937,324 | B2 | 5/2011 | Patterson |
| 7,938,318 | B2 | 5/2011 | Fein |
| 7,954,705 | B2 | 6/2011 | Mullen |
| 7,959,076 | B1 | 6/2011 | Hopkins, III |
| 7,996,288 | B1 | 8/2011 | Stolfo |
| 8,025,223 | B2 | 9/2011 | Saunders |
| 8,046,256 | B2 | 10/2011 | Chien |
| 8,060,448 | B2 | 11/2011 | Jones |
| 8,060,449 | B1 | 11/2011 | Zhu |
| 8,074,877 | B2 | 12/2011 | Mullen |
| 8,074,879 | B2 | 12/2011 | Harris |
| 8,082,210 | B2 | 12/2011 | Hansen |
| 8,095,113 | B2 | 1/2012 | Kean |
| 8,104,679 | B2 | 1/2012 | Brown |
| RE43,157 | E | 2/2012 | Bishop et al. |
| 8,109,436 | B1 | 2/2012 | Hopkins, III |
| 8,121,942 | B2 | 2/2012 | Carlson |
| 8,121,956 | B2 | 2/2012 | Carlson |
| 8,126,449 | B2 | 2/2012 | Beenau |
| 8,132,723 | B2 | 3/2012 | Hogg et al. |
| 8,171,525 | B1 | 5/2012 | Pelly |
| 8,175,973 | B2 | 5/2012 | Davis et al. |
| 8,190,523 | B2 | 5/2012 | Patterson |
| 8,196,813 | B2 | 6/2012 | Vadhri |
| 8,205,791 | B2 | 6/2012 | Randazza |
| 8,219,489 | B2 | 7/2012 | Patterson |
| 8,224,702 | B2 | 7/2012 | Mengerink |
| 8,225,385 | B2 | 7/2012 | Chow |
| 8,229,852 | B2 | 7/2012 | Carlson |
| 8,265,993 | B2 | 9/2012 | Chien |
| 8,280,777 | B2 | 10/2012 | Mengerink |
| 8,281,991 | B2 | 10/2012 | Wentker et al. |
| 8,328,095 | B2 | 12/2012 | Oder, II |
| 8,336,088 | B2 | 12/2012 | Raj et al. |
| 8,346,666 | B2 | 1/2013 | Lindelsee et al. |
| 8,376,225 | B1 | 2/2013 | Hopkins, III |
| 8,380,177 | B2 | 2/2013 | Laracey |
| 8,387,873 | B2 | 3/2013 | Saunders |
| 8,401,539 | B2 | 3/2013 | Beenau |
| 8,401,898 | B2 | 3/2013 | Chien |
| 8,402,555 | B2 | 3/2013 | Grecia |
| 8,403,211 | B2 | 3/2013 | Brooks |
| 8,412,623 | B2 | 4/2013 | Moon |
| 8,412,837 | B1 | 4/2013 | Emigh |
| 8,417,642 | B2 | 4/2013 | Oren |
| 8,447,699 | B2 | 5/2013 | Batada |
| 8,453,223 | B2 | 5/2013 | Svigals |
| 8,453,925 | B2 | 6/2013 | Fisher |
| 8,458,487 | B1 | 6/2013 | Palgon |
| 8,484,134 | B2 | 7/2013 | Hobson |
| 8,485,437 | B2 | 7/2013 | Mullen |
| 8,494,959 | B2 | 7/2013 | Hathaway |
| 8,498,908 | B2 | 7/2013 | Mengerink |
| 8,504,475 | B2 | 8/2013 | Brand et al. |
| 8,504,478 | B2 | 8/2013 | Saunders |
| 8,510,816 | B2 | 8/2013 | Quach |
| 8,433,116 | B2 | 9/2013 | Davis et al. |
| 8,528,067 | B2 | 9/2013 | Hurry et al. |
| 8,533,860 | B1 | 9/2013 | Grecia |
| 8,538,845 | B2 | 9/2013 | Liberty |
| 8,555,079 | B2 | 10/2013 | Shablygin |
| 8,566,168 | B1 | 10/2013 | Bierbaum |
| 8,567,670 | B2 | 10/2013 | Stanfield |
| 8,571,939 | B2 | 10/2013 | Lindsey |
| 8,577,336 | B2 | 11/2013 | Mechaley, Jr. |

(56) References Cited

U.S. PATENT DOCUMENTS

| | | |
|---|---|---|
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0125597 A1 | 5/2011 | Oder, II |
| 2011/0153437 A1 | 6/2011 | Archer |
| 2011/0153498 A1 | 6/2011 | Makhotin et al. |

(56) References Cited

U.S. PATENT DOCUMENTS

| | | |
|---|---|---|
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023556 A1* | 1/2012 | Schultz ............... G06F 21/41 726/4 |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |

(56) References Cited

U.S. PATENT DOCUMENTS

| | | |
|---|---|---|
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0365363 A1 | 12/2014 | Knudsen |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1* | 7/2015 | Kumnick ........... G06Q 20/4016 705/67 |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0304318 A1* | 10/2015 | Delsuc ................ H04L 63/0815 726/7 |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0220818 A1 | 8/2017 | Nagasundaram et al. |
| 2017/0228723 A1 | 8/2017 | Taylor |
| 2017/0295155 A1 | 10/2017 | Wong et al. |
| 2017/0364903 A1 | 12/2017 | Lopez |
| 2018/0075081 A1 | 3/2018 | Chipman |

FOREIGN PATENT DOCUMENTS

| | | |
|---|---|---|
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Stubbs et al., U.S. Appl. No. 62/103,522 (unpublished), Methods and Systems for Wallet Provider Provisioning filed Jan. 14, 2015.

Flurscheim et al., U.S. Appl. No. 62/108,403 (unpublished), Wearables With NFC HCE filed Jan. 27, 2015.

Kinagi, U.S. Appl. No. 62/117,291 (unpublished), Token and Cryptogram Using Transaction Specific Information filed Feb. 17, 2015.

Galland et al. U.S. Appl. No. 62/128,709 (unpublished), Tokenizing Transaction Amounts filed Mar. 5, 2015.

Rangarajan et al., U.S. Appl. No. 61/751,763 (unpublished), Payments Bridge filed Jan. 11, 2013.

Li, U.S. Appl. No. 61/894,749 (unpublished), Methods and Systems for Authentication and Issuance of Tokens in a Secure Environment filed Oct. 23, 2013.

Aissi et al., U.S. Appl. No. 61/738,832 (unpublished), Management of Sensitive Data filed Dec. 18, 2012.

(56) References Cited

OTHER PUBLICATIONS

Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Lopez, et al., U.S. Appl. No. 15/462,658 (Unpublished), Replacing Token on a Multi-Token User Device, filed Mar. 17, 2017.
Kaja, et al., U.S. Appl. No. 15/585,077 (Unpublished), System and Method Using Interaction Token, filed May 2, 2017.

* cited by examiner

METHODS AND SYSTEMS FOR PROVIDING A LOW VALUE TOKEN BUFFER

CROSS-REFERENCES TO RELATED APPLICATIONS

This application is a non-provisional application of and claims the benefit of U.S. Provisional Application No. 62/132,499, filed on Mar. 12, 2015, which is herein incorporated by reference in its entirety for all purposes.

BACKGROUND

As more information is collected and stored by companies and governments, such organizations have become targets for hackers and other malicious third parties. Typical organizations have many different projects, systems, databases, and areas that may be difficult to monitor for malicious activity at all times due to the vast size and resources involved in such operations. Thus, despite the best efforts of such organizations, data breaches occur regularly and data security is an important security concern for organizations of all sizes. Accordingly, limiting sensitive data storage to as few possible databases as possible within an organization and/or across organizations is an important security solution to such concerns.

In transaction processing systems, some data security issues have been addressed through the use of tokenization to substitute sensitive real credentials with a token. The tokens are not as sensitive as payment information (e.g., a primary account number or credit card number) that can be used to initiate transactions through other transaction channels and the tokens allow additional security controls to be applied to ensure transactions are authentic and not fraudulent. Further, tokens may be domain restricted (e.g., only used in a specific transaction channel such as e-commerce), thereby limiting their potential use if the tokens are compromised.

However, although tokens provide a layer of protection against interception of real credentials (e.g., by being domain restricted), the tokens can still be used by malicious third parties to initiate fraudulent transactions in some circumstances. Further, payment processors and other entities may use the tokens and/or real credentials (or any other sensitive consumer information) to provide a variety of different processes including payment processing capabilities, fraud risk analyses, loyalty program management, etc. Many such organizations may have thousands of different databases storing sensitive consumer information. It is expensive and inefficient to comply with the highest security standards for all of these databases. Accordingly, even tokenized systems provide targets for malicious third parties to attack and breach can lead to liability and loss.

Embodiments of the invention address these and other problems, individually and collectively.

SUMMARY

Embodiments are directed to providing an interchanging tokenization scheme that can provide a low value token buffer (i.e., a buffer that uses tokens that are not directly capable of being used to initiate transactions and/or are not directly tied to real credentials) within an organization to reduce access to high value tokens (i.e., tokens that are directly tied to real credentials and/or that can be used to initiate or conduct transactions) within the organization. Accordingly, whenever a high value token is received by the organization, the high value token is changed to a low value token while being used or stored within any of the organization's many different systems, processes, databases, etc. The low value token may be transformed to high value token or to real credentials upon (or before) delivery outside the organization. Only a few highly secured tokenization vaults (i.e., secure databases) and corresponding computer systems may have access to the relationships between the high and low value tokens and/or the underlying real credentials.

Accordingly, embodiments result in less sensitive information that can be tied directly to real credentials and/or used to initiate a transaction being used and stored within an organization. For example, according to some embodiments, applications within an enterprise may use low value tokens to provide services related to a particular consumer or account. Thus, embodiments increase data security because sensitive data within an organization can be consolidated and centralized within an organization to focus security on such sensitive systems. Additionally, fewer security resources are necessary to ensure that each and every system, computer, and database within an organization complies with security requirements associated with storing information that can be directly tied to and/or used as real credentials.

One embodiment of the present invention is directed to a method. The method comprises receiving, by a first server computer, a request message including a first token from an access device, the first token being a substitute for a real credential, the first token being configured to be processed by the access device to conduct a transaction. The method further comprises determining, by the first server computer, a second token associated with the first token, the second token not being configured to be processed by the access device to conduct the transaction. The method further comprises updating, by the first server computer, the request message to include the second token. The method further comprises sending, by the first server computer, the request message including the second token to a second server computer, the second server computer using the second token to either obtain the first token or the real credential to incorporate into the request message before transmitting the request message to an authorizing entity computer.

An additional or alternative embodiment of the invention is directed to a method. The method comprises receiving, by a second server computer from a first server computer, a request message including a second token, the second token not being configured to be processed by an access device to conduct a transaction. The method further comprises determining, by the second server computer, a first token associated with the second token or a real credential, the first token being a substitute for the real credential, the first token being configured to be processed by the access device to conduct a transaction. The method further comprises updating, by the second server computer, the request message to include the first token or the real credential. The method further comprises sending, by the second server computer, the request message including the first token or the real credential to an authorizing entity computer, the authorizing entity computer either using the first token to obtain the real credential or using the real credential to process the request.

An additional or alternative embodiment of the invention is directed to a method. The method comprises receiving, by a server computer, a request message including a first token from an access device, the first token being a substitute for a real credential, the first token being configured to be processed by the access device to conduct a transaction. The method further comprises determining, by the server computer, a second token associated with the first token, the second token not being configured to be processed by the access device to conduct the transaction. The method further comprises sending, by the server computer, the second token to an application system, wherein the application system performs analysis using the second token. The method further comprises receiving, by the server computer, the second token and results of the analysis from the application system, and determining, by the server computer, the real credential using the second token. The method further comprises updating, by the server computer, the request message to include the real credential, and sending, by the server computer, the request message including the real credential to an authorizing entity computer.

Other embodiments include systems, computer-readable mediums, and apparatuses for performing the methods described above.

These and other embodiments of the invention are described in further detail below.

DETAILED DESCRIPTION

Figure 1:
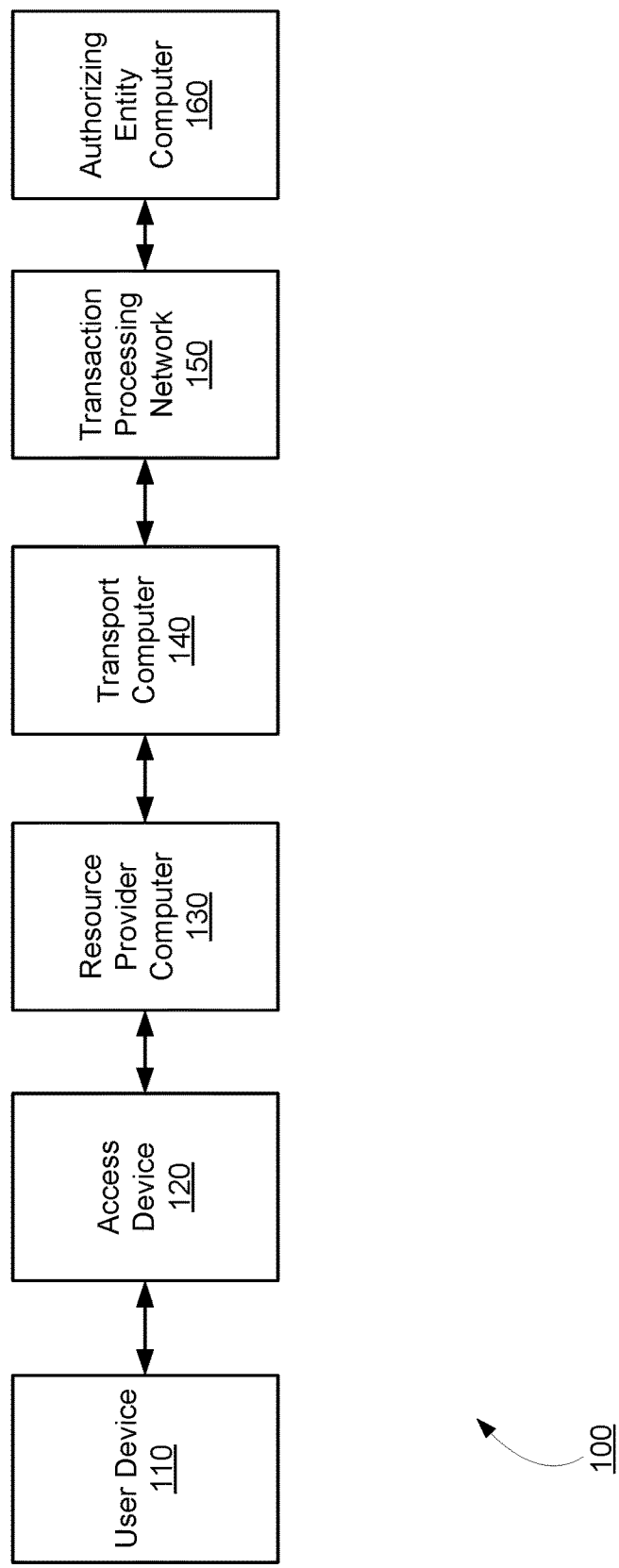
FIG. 1 shows a block diagram of a system according to embodiments of the present invention.

Embodiments are directed to methods, systems, and apparatuses that provide a low value token buffer within an organization (or multiple different organizations) to reduce access within a system (or series of systems) to information that can be directly tied to real credentials and other sensitive information. By providing a low value token buffer, embodiments increase the data security of one or multiple organizations by limiting the amount of sensitive information that is available to sub-systems, applications, and other entities involved with a process.

In present payment systems, payment information may be tokenized to protect real credentials (e.g., payment credentials) from interception during transmission between payment entities and to limit misuse by third parties. Tokens include substitute identifiers that can be used in lieu of real credentials or payment account identifiers to identify an account, consumer, etc. Tokens can be either high value tokens or low value tokens. In one embodiment, high value tokens may include any tokens that are directly associated with real credentials or sensitive account information. Low value tokens may include any identifiers that are not directly associated with real credentials or sensitive account information. For example, low value tokens may instead be directly associated with high value tokens.

While tokens improve the security of data transmissions across various entities in a payment transaction, the use of tokens still provide some security concerns because high value tokens that are intercepted may still be used to request real credentials (e.g., primary account number (PAN)) and/or the tokens may still open up merchants to higher security requirements, protocols, and infrastructure requirements (e.g., PCI liability) as well as security concerns and liability. Accordingly, it is desirable to minimize the number of people and programs that can access a token server or service, both for overall security and to reduce potential security costs and liability.

Embodiments are directed to a system that implements a low value token buffer to provide a secure environment that relies on a central secure system as the only entity that stores the relationship mapping between original personally identifiable information (PII), low value tokens, and high value tokens. Accordingly, the rest of the payment ecosystem or applications associated with the transaction processing network may be configured to process the low value token and identify consumers through reference to the low value token. Thus, the more sensitive token (e.g., high value token that is directly related to real credentials) is buffered from use by other system resources (whether internal or external). Accordingly, the system's data security is improved as a lower sensitivity, unique token is used to reference consumers within the system, and less sensitive data is stored in various systems.

As an illustration, a real credential may be a 16-digit PAN (primary account number) that may be a normal credit card number that can be used in transactions. The high value token may also be 16 digits, but may be a different number than the real credential. Because the high value token and the real credential have the same format, both values can be processed by a typical transaction processing system to conduct a transaction. The high value token may be directly related to the real credential by a mathematical formula, or a data table that links the real credential to the to the high value token. The low value token may be directly related to the high value token and may not be capable of being processed to conduct a transaction. For instance, the low value token may be 25 digits in length and may include letters, whereas the high value token and the real credentials only contain numbers. Further, the low value token may be linked to the high value token either mathematically or through another data table that links the high value token to the low value token.

Embodiments provide a number of advantages, including allowing any system or entity that stores sensitive cardholder data and anything used to describe such data to replace the cardholder data with a non-sensitive token that lacks any of the payment or financial properties of the high value token. Further, there is also no duplication or requesting/provisioning of sensitive PII data as it is stored in a single central location within the entity. Accordingly, embodiments effectively ensure cardholder data segmentation and separation from PCI in-scope coverage and potential liabilities. There are significant advantages including better security and regulatory compliance out-scoping of systems involved in the tokenization process.

In some embodiments, the low value token does not carry any payment properties and cannot directly or easily map back to the original PII data or PAN. Thus, the original high value token is the only direct connection to the real credentials. In other embodiments, the high value token and the low value token are de-coupled within systems to provide additional security within the system. Both systems are described below in reference to FIGS. 2 and 4.

Before discussing specific embodiments and examples, some descriptions of terms used herein are provided below.

An "access device" may be any suitable device that provides access to a remote system. An access device may also be used for communicating with a resource provider computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Further, an "access device" may be an example of or part of a "resource provider computer," if the access device is operated by a resource provider.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue real credentials stored on payment devices.

"Real credentials" may comprise any evidence of authority, rights, or entitlement to privileges. For example, real credentials may include any suitable information associated with and/or identifying an account (e.g., a payment account and/or payment device associated with the account). Such information may be directly related to the account. Examples of account information may include an "account identifier" such as a PAN (primary account number or "account number"), a gift card number or code, a prepaid card number or code, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, real credentials may be considered sensitive information.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

Tokens can be either high value tokens or low value tokens. In one embodiment, high value tokens may include any tokens that are directly associated with real credentials or sensitive account information. Low value tokens may include any identifiers that are not directly associated with real credentials or sensitive account information. For example, low value tokens may instead be directly associated with high value tokens.

In another embodiment, high value tokens may include any tokens that can be directly used to initiate a transaction, while low value tokens may include any identifiers that cannot be directly used to initiate a transaction. For example, high value tokens may be configured to be processed by an access device to conduct a transaction, while low values tokens may not be configured to be processed by an access device. The high value token may be configured to be processed by an access device to conduct a transaction by virtue of its format, length, characters and/or content. For example, the high value token may be a 16-digit number resembling a payment credential that may be suitably tied to a real credential at a transaction processing network. In contrast, the low value token may not be configured to be processed by an access device to conduct a transaction by virtue of its format, length, characters and/or content. For example, the low value token may be an 8-digit combination of letters and/or numbers that cannot be suitably used as a payment credential or passed as a payment credential to a transaction processing network. In another example, the low value token may be a 16-digit number resembling a payment credential, but may not be suitably tied to a real credential at a transaction processing network and/or may not be accepted as a payment credential by a transaction processing network. Thus, a transaction initiation attempt with a low value token would fail.

FIG. 1 shows a block diagram of a transaction system 100 according to embodiments of the present invention. The system 100 includes a user device 110, an access device 120, a resource provider computer 130, a transport computer 140, a transaction processing network 150, and an authorizing entity computer 160. Each of these systems and computers may be in operative communication with each other. The components in FIG. 1 may communicate via any suitable communication medium (including the Internet), using any suitable communications protocol.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

A user (not shown) may operate user device 110. User device 110 may be any device suitable to carry out a financial transaction or any other additional related actions. In one example, user device 110 may be a magnetic strip card or chip (contactless) card storing real credentials and/or high value tokens. In another example, user device 110 may be a communication device that includes a memory that may store a mobile wallet application or payment application. The application may be provisioned with account information (e.g., real credentials and/or high value tokens) to enable the communication device to conduct transactions. The communication device may also include a secure element that can be implemented in either hardware and/or software, which may store sensitive account or personal information. User device 110 may be capable of communicating with one or more entities, including access device 120, to initiate a transaction. For example, a user may swipe or wave user device 110 on or over access device 120 to transfer a high value token to access device 120.

Access device 120 is configured to transmit transaction data, including account information (real credentials and/or high value tokens) to resource provider computer 130. In one embodiment, access device 120 is configured to generate an authorization request message including the transaction data to send to resource provider computer 130. Access device 120 may further be configured to determine whether the received account information can be used to carry out the transaction, i.e., whether it is of the proper format, length and content to be a real credential or high value token.

Resource provider computer 130 may be configured to receive the transaction data from access device 120 and to generate an authorization request message, if not already generated by access device 120. Resource provider computer 130 may enable a resource provider such as a merchant to engage in transactions, sell goods or services, or provide access to goods or services to a consumer. The resource provider computer 130 may accept multiple forms of payment and may use multiple tools to conduct different types of transactions. In some examples, the resource provider computer 130 may include or incorporate access device 120 at a physical store operated by the merchant for in-person transactions. The resource provider computer 130 may also enable the merchant to sell goods and/or services via a website, and may accept payments over the Internet.

Transport computer 140 may be configured to receive authorization request messages from resource provider computer 130, and provide them to transaction processing network 150. Transport computer 140 may be located, for example, at a bank associated with resource provider computer 130. In some embodiments, transport computer 140 is not required, and resource provider computer 130 communicates directly with transaction processing network 150.

Transaction processing network 150 may be configured to receive authorization request messages from transport computer 140. Transaction processing network 150 may comprise one or more server computers including a processor and a computer readable medium coupled to the processor, the computer readable medium comprising code executable by the processor. Transaction processing network 150 may include data processing subsystems, networks, and operations used to support and deliver certificate authority services, authorization services, exception file services, transaction scoring services, and clearing and settlement services. An exemplary transaction processing network 150 may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

In some embodiments, transaction processing network 150 is configured to extract high value tokens and/or real credentials from received authorization request messages, and convert them into low value tokens for use within the transaction processing network 150. The portion of transaction processing network 150 using only low value tokens is referred to herein as a "low value token buffer". Transaction processing network 150 is further configured to convert the low value token into real credentials, and to update the authorization request message with the real credentials, prior to sending the authorization request message to the authorizing entity computer 160. These processes are described further herein with respect to FIGS. 2-5. Transaction processing network 150 may perform these functions in conjunction with one or more token servers, described further herein with respect to FIG. 6.

The authorizing entity computer 160 is typically run by a business entity (e.g., a bank) that may have issued the real credential and/or tokens used for the transaction. Some systems can perform both authorizing entity computer 160 and transport computer 140 functions. When a transaction involves a payment account associated with the authorizing entity computer 160, the authorizing entity computer 160 may verify the account and respond with an authorization response message to the transaction processing network 150. Transaction processing network 150 may perform the reverse functions when receiving the authorization response message from the authorizing entity computer 160 (i.e., convert the real credential into a low value token, convert the low value token into a high value token). The authorization response message including the high value token can be provided to the transport computer 140, which forwards it to the resource provider computer 130, which may forward it to the access device 120.

At a later time (e.g., at the end of the day), a clearing and settlement process can occur between the transport computer 140, the transaction processing network 150, and the authorizing entity computer 160.

Figure 2:
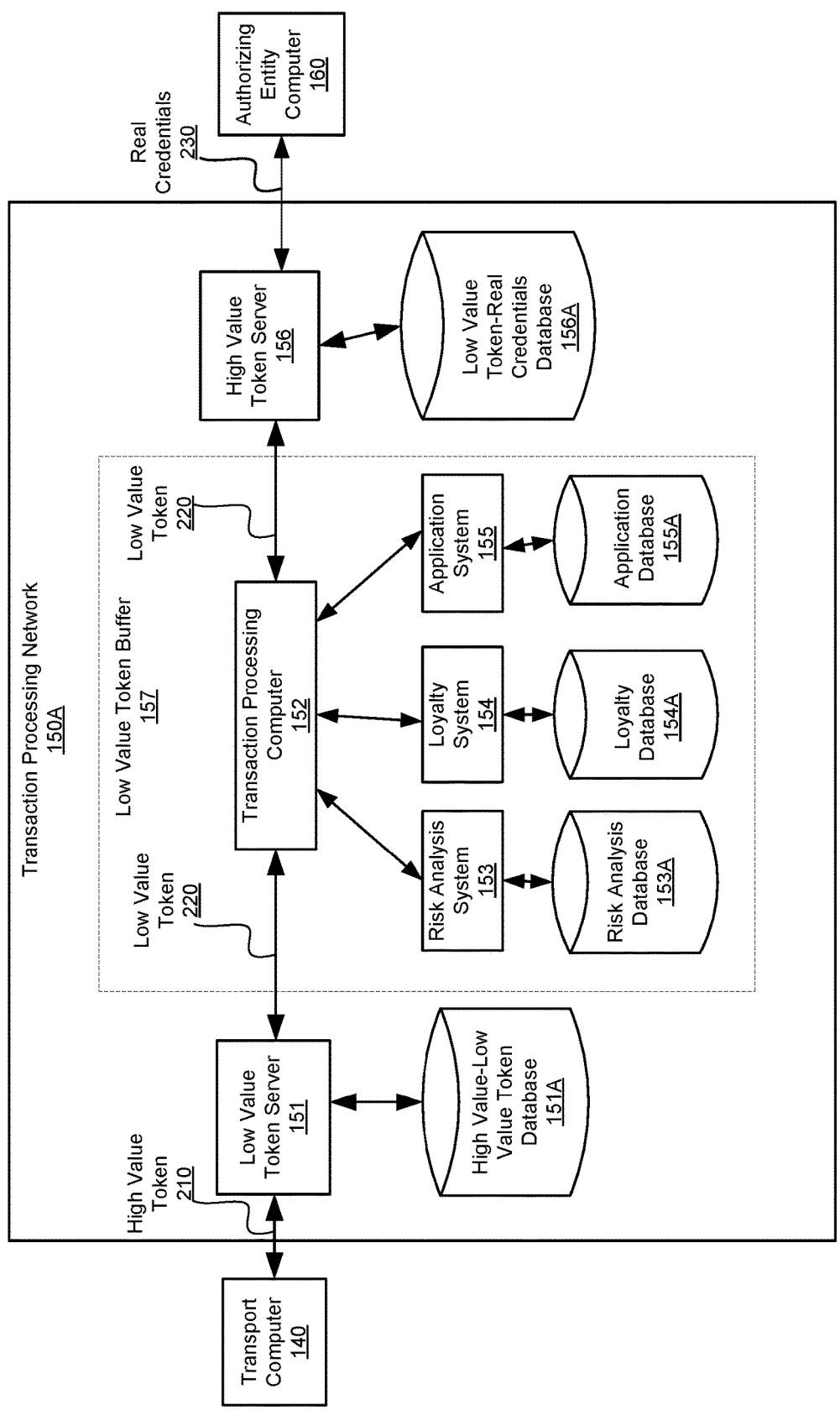
FIG. 2 shows a block diagram of a transaction processing network implementing a low value token buffer according to embodiments of the present invention.

FIG. 2 shows a block diagram of a transaction processing network 150A implementing a low value token buffer according to embodiments of the present invention. Transaction processing network 150A may be used to implement transaction processing network 150 of FIG. 1, for example. Although FIG. 2 shows the use of a low value token buffer 157 in the context of a payment transaction authorization process, embodiments may be used with any request that is associated with tokenized data. Accordingly, the specific applications, sub-routines, etc. are exemplary and concepts disclosed herein are not limited to such processes.

Transaction processing network 150A comprises a low value token server 151 in communication with a high value-low value token database 151A. Low value token server 151 can be an example of a first server computer. Low value token server 151 can be at an edge of the transaction processing network 150 or a subsystem of the transaction processing network 150, and can be configured to receive a high value token 210, look up the associated low value token 220 in high value-low value token database 151A, and provide the low value token 220 to a low value token buffer 157. In some embodiments, when a low value token 220 is not already associated with the high value token 210 in high value-low value token database 151A, low value token server 151 may generate a random low value token 220 and associate the low value token 220 with the high value token 210 and/or may generate a low value token 220 by applying a low value tokenization algorithm to the high value token 210, as described further herein. The low value tokenization computer may then update the high value-low value token database 151A with the relationship between the high value token 210 and low value token 220. In some embodiments, the relationships may be permanent such that once an association between a high value token 210 and low value token 220 has been set, the low value token 220 may be used as a substitute for any future uses of the high value token. In other embodiments, the association may be temporary or limited in nature. Low value token server 151 is further configured to receive a low value token 220, look up the associated high value token 210 in high value-low value token database 151A, and provide the high value token 210 to a transport computer 140.

Low value token buffer 157 includes a number of components 152-155 only storing, using, analyzing, and having access to the low value token 220. The low value token buffer 157 may include any suitable region (physical) and/or collection of computational devices (even if geographically or physically distributed) that uses the low value token. These components 152-155 do not have access to a low value token-high value token mapping, a low value token-real credential mapping, or a high value token-real credential mapping. In this embodiment, low value token buffer 157 includes a transaction processing computer 152 in communication with a number of application systems (e.g., a risk analysis system 153, a loyalty system 154, and another application system 155). Risk analysis system 153 has an associated risk analysis database 153A; loyalty system 154 has an associated loyalty database 154A; and application system 155 has an associated application database 155A. Although shown and described as including risk analysis system 153, loyalty system 154, and application system 155, it is contemplated that low value token buffer 157 may include more, less, or different application systems using the low value token 220. These application systems may, for example, perform any sort of analysis using the second token, and generating results to be returned to the transaction processing computer 152.

Accordingly, the low value token buffer 157 may store and use the low value tokens instead of real credentials or other personally identifiable information (PII). Thus, the risk analysis database 153A, loyalty database 154A, and any other application databases 155A may include low value tokens instead of high value tokens and/or real credentials, so that if these systems are hacked or otherwise breached, the information that is stored in the databases cannot be used to directly obtain real credentials and/or initiate a transaction. Before a malicious third party could do so, the malicious third party would have to determine the corresponding high value token. Because the relationship between the low value token and the high value token is stored in a single database and/or system that is separate from any database or logic that can transform the high value token to real credentials and that can be monitored more closely, embodiments increase the data security of the organization generally and the data security of consumer accounts.

Transaction processing network 150A further comprises a high value token server 156 in communication with a low value token-real credentials database 156A. High value token server 156 can be an example of a second server computer. High value token server 156 is configured to receive a low value token 220, look up (or otherwise determine) the associated real credential 230 in low value token-real credentials database 156A, and provide the real credential 230 to an authorizing entity computer 160. Correspondingly, high value token server 156 is further configured to receive a real credential 230, look up the associated low value token 220 in low value token-real credentials database 156A, and provide the low value token 220 to the low value token buffer 157.

Even though the low value token 220 is directly tied to the real credential 230 in low value token-real credentials database 156A, the token may be considered a low value token because the high value token server may not allow for payment requests or other types of payment-related requests to be submitted from outside entities and/or client facing computers. Accordingly, there may be limited access to the real credential exchange with low value tokens, and clients/consumers are not able to initiate a transaction using the low value token, even though there is a direct relationship between the low value token and the real credentials in a secured database of the system.

In some embodiments, instead of using the low value token to real credential mapping, the transaction processing network 150A may exchange the low value token 220 for a high value token 210, and then exchange the high value token 210 for a real credential 230. The low value token to high value token mapping may occur at different computers or systems than the high value token to the real credential translation, or they may occur at the same computer or system if appropriate security and separation is in place.

Although shown and described as being integrated into transaction processing network 150A, it is contemplated that low value token server 151 and/or high value token server 156 may be separate from transaction processing network 150A in other embodiments. The components and functions of low value token server 151 and high value token server 156 are described further herein with reference to FIG. 6.

Figure 3:
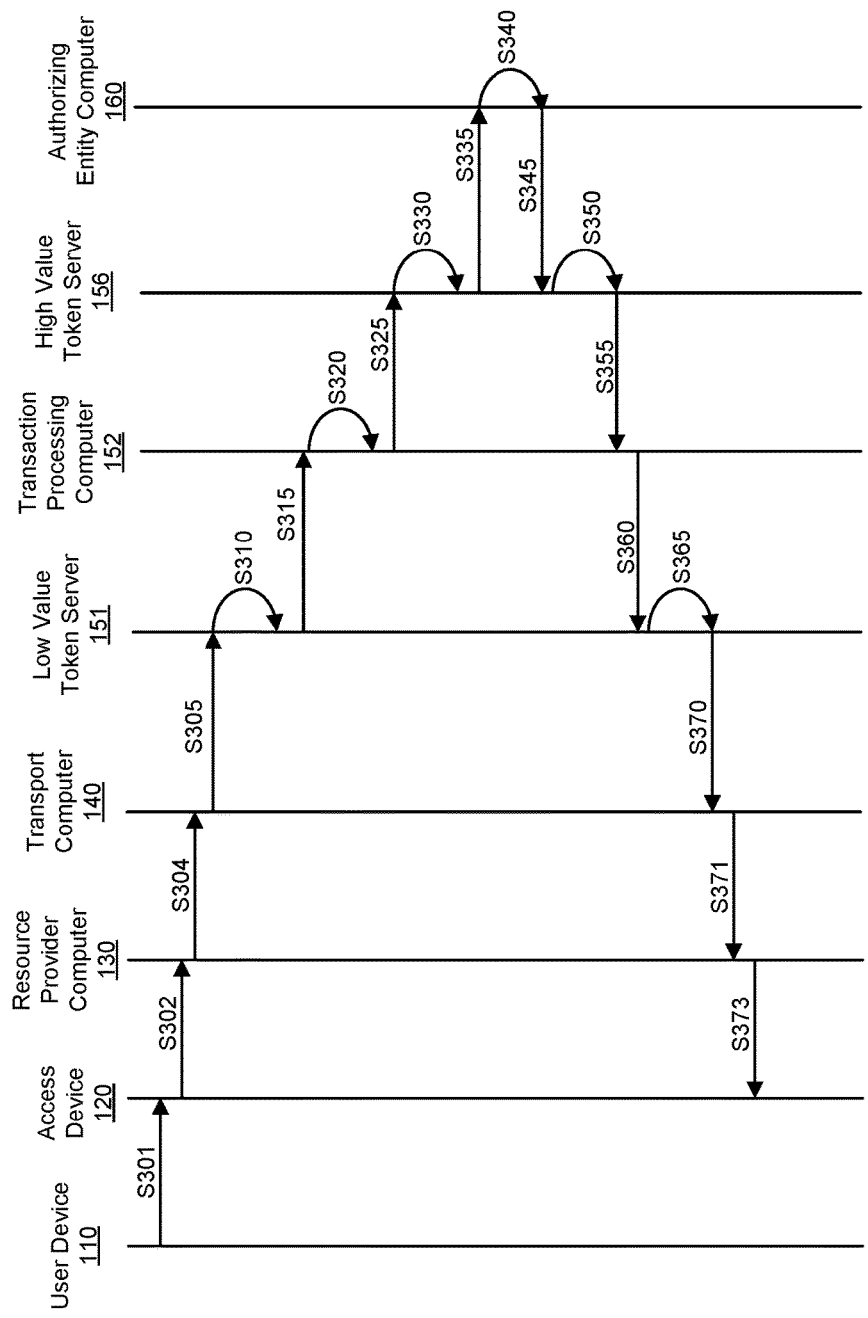
FIG. 3 shows a flow diagram of a method for implementing a low value token buffer in a transaction processing network according to embodiments of the present invention.

FIG. 3 is a flow diagram of a method for implementing a low value token buffer in a transaction processing network according to embodiments of the present invention. At step S301, a user device 110 initiates a transaction with access device 120 by providing a high value token for a payment, for example. At step S302, access device 120 may provide the transaction data and the high value token to the resource provider computer 130, or may generate an authorization request message using the high value token and the transaction data and send the authorization request message to the resource provider computer 130. At step S304, the resource provider computer 130 receives the authorization request message containing the high value token (or generates it if it was not previously generated by the access device 120), and forwards the authorization request message containing the high value token to a transport computer 140. At step S305, the transport computer 140 determines the relevant transaction processing network and/or the relevant token server (i.e., low value token server 151), and forwards the authorization request message containing the high value token to the low value token server 151.

At step S310, the low value token server 151 receives the high value token and determines a low value token that is associated with the high value token. The low value token server 151 may determine a low value token through any suitable method. For example, the low value token server 151 may search a database for a low value token that has already been associated with the high value token, may generate a random low value token and associate the low value token with the high value token, may generate a low value token by applying a low value tokenization algorithm to the high value token, and/or may perform any number of additional methods of determining a low value token to associate with the high value tokens.

The low value token server 151 may then update the high value-low value tokens database with the relationship between the high value and low value tokens. In some embodiments, the relationships may be permanent such that once an association between a high value and low value token has been set, the low value token may be used as a substitute for any future uses of the high value token. In other embodiments, the association may be temporary or limited in nature.

The low value token server 151 may update the authorization request message to include the low value token and may send the updated authorization request message to transaction processing computer 152 for further processing of the request at step S315. Accordingly, because the high value token has been substituted for a low value token and because the transaction processing computer 152 (as well as other applications associated with the transaction processing computer 152) do not have access to a low value token to high value token and/or low value token to real credentials mapping, the transaction processing computer 152 (as well as other internal applications/systems) are considered to be within a low value token buffer.

At step S320, the transaction processing computer 152 receives the updated authorization request message including the low value token and starts processing the authorization request message as a traditional payment transaction. For example, the transaction processing computer 152 may perform a number of processing and/or analysis steps using the low value token that includes a fraud risk analysis, loyalty program processing, and any other application system processing. Thus, the transaction processing computer 152 may send the updated authorization request message and/or generate a new request including the low value token to other internal and/or external systems for processing of the transaction request. However, the other applications and systems may use the low value token to perform the analysis and processing.

The transaction processing computer 152 receives the result of the various application processes and continues processing the transaction. The application processing responses include the low value token 220 and do not include the associated high value token or the associated real credentials. Accordingly, the transaction processing computer 152 may determine that processing of the transaction request should continue and that an authorizing entity computer 160 outside of the transaction processing network should be approached for authorization of the authorization request message. The transaction processing computer 152 may send the authorization request message including the low value token and the results of the application processes completed in step S320 to a high value token server 156 at step S325 that may be configured to exchange the low value token for the real credentials. In some embodiments, instead of using the low value token to real credential mapping, the system may exchange the low value token for a high value token and then exchange the high value token for real credentials.

At step S330, the high value token server 156 receives the low value token from the transaction processing computer 152, determines real credentials associated with the low value token, and updates the authorization request message to include the real credentials. Even though the low value token is directly tied to real credentials, the token may be considered a low value token because the high value tokenization computer may not allow for payment requests or other types of payment related requests to be submitted from outside entities and/or client facing computers. Accordingly, there may be limited access to the real credentials exchange with low value tokens and clients/consumers may not be able to initiate a transaction using the low value token, even though there is a direct relationship between the low value token and the real credentials in a secured database of the system.

At step S335, the high value token server 156 sends the authorization request message including the real credentials to an authorizing entity computer 160. At step S340, the authorizing entity computer 160 may determine whether to approve the transaction based on available funds, a risk analysis, etc. At step S345, the authorizing entity computer 160 may return an authorization response message to the high value token server 156.

At step S350, the high value token server 156 may obtain the low value token associated with the real credentials, and update the authorization response message to include the low value token instead of the real credentials. At step S355, the high value token server 156 may send the updated authorization response message to the transaction processing computer 152.

The transaction processing computer 152 may receive the authorization response message and may determine the appropriate transport computer 140 to forward the authorization response message to. The authorization response message may include the low value token such that the low value token buffer is again created where no real credentials are allowed to be used in any requests, responses, processes, etc. Instead, the systems may reference consumer accounts through the low value tokens and may only store the low value token in any databases within the low value token buffer. At step S360, the transaction processing computer 152 may send the authorization response message to the low value token server 151.

At step S365, the low value token server 151 receives the authorization response message including the low value token, may determine the high value token associated with the low value token, and may update the response to include the high value token. At step S370, the low value token server 151 may send the response including the high value token to the transport computer 140. The transport computer 140 may forward the authorization response message to the resource provider computer 130 at step S371. At step S373, the response may be provided to the access device 120, which may, in some embodiments, provide the user with an indication of whether or not the transaction was authorized.

Accordingly, embodiments use low value token buffers to improve data security and use the isolation of the relationships between low value tokens, high value tokens, and real credentials in order to secure an organization's various sub-systems, processes, databases, etc.

At the end of the day or at some other suitable period of time, a clearing a settlement process could occur between the transport computer 140, the transaction processing computer 152, and the authorizing entity computer 160. A similar or different message conversion protocol can be used.

The steps shown in FIG. 3 can form part of a single transaction and can all be completed in a short period of time (e.g., less than 5 minutes, 1 minute, 30 seconds, 10 seconds, etc.).

Figure 4:
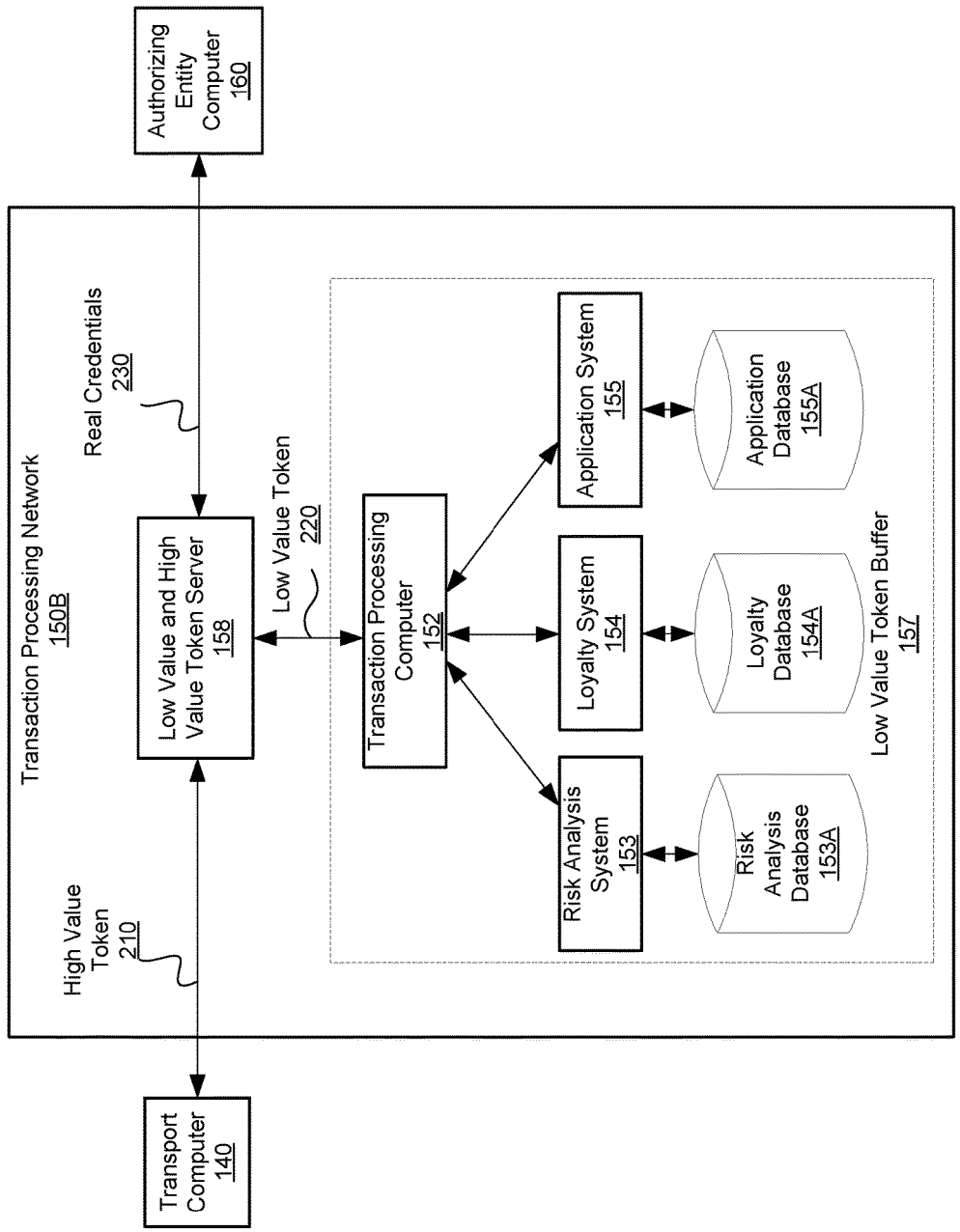
FIG. 4 shows a block diagram of a transaction processing network implementing a low value token buffer according to embodiments of the present invention.

FIG. 4 shows a block diagram of a transaction processing network 1506 including a single low value and high value token server 158 according to embodiments of the present invention. The system shown in FIG. 4 is similar to FIG. 2 described above, except that a single low value and high value token server 158 manages the low value token 220, the high value token 210, and the real credentials 230 relationships and associations. Low value and high value token server 158 may comprise a server computer. Accordingly, FIG. 4 may complete similar functionality and steps as FIG. 2 described above; however, the low value and high value token server 158 and corresponding token databases (not shown) control all of the relationships between the low value token 220, high value token 210, and the real credentials 230, as described further below with respect to FIG. 5.

Figure 5:
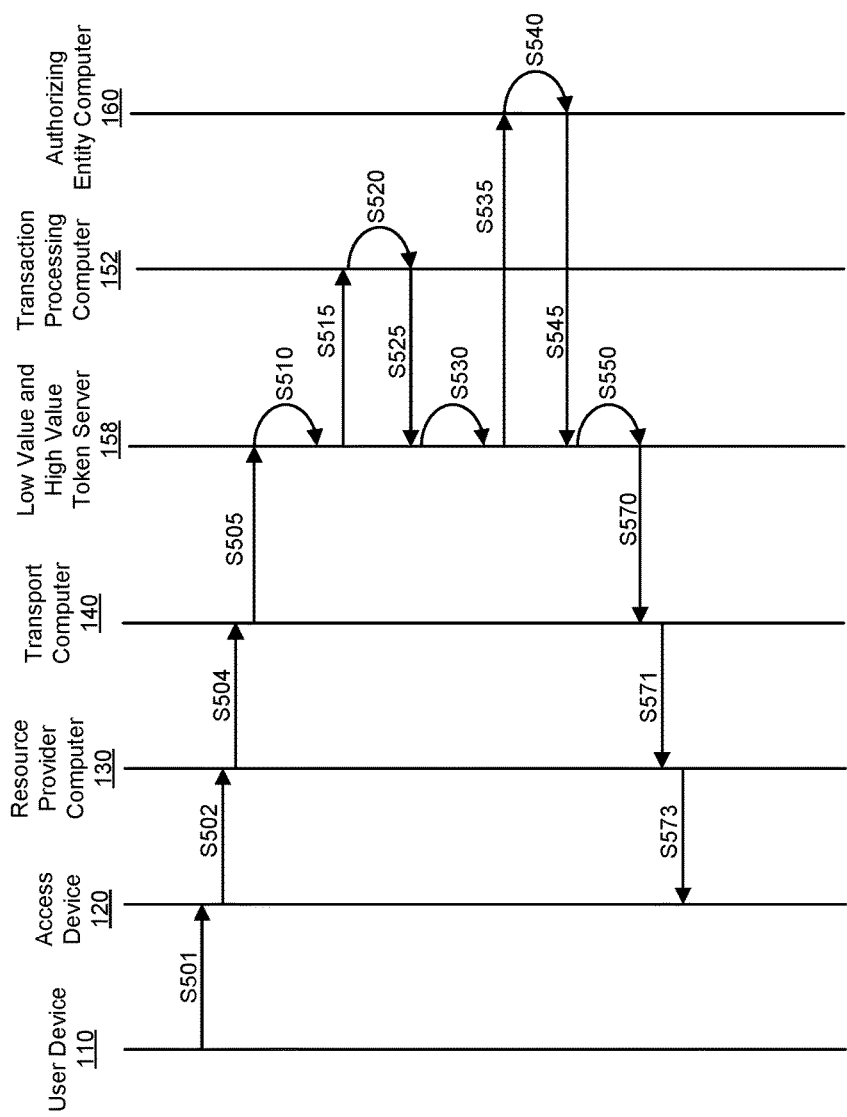
FIG. 5 shows a flow diagram of a method for implementing a low value token buffer in a transaction processing network according to embodiments of the present invention.

FIG. 5 is a flow diagram of a method for implementing a low value token buffer in a transaction processing network including a single low value and high value token server 158 according to embodiments of the present invention. At step S501, a user device 110 initiates a transaction with access device 120 by providing a high value token for a payment, for example. At step S502, access device 120 may provide the transaction data and the high value token to the resource provider computer 130, or may generate an authorization request message using the high value token and the transaction data and send the authorization request message to the resource provider computer 130. At step S504, the resource provider computer 130 generates an authorization request message containing the high value token, if not previously generated, and forwards the authorization request message containing the high value token to a transport computer 140. At step S505, the transport computer 140 determines the relevant transaction processing network and/or the relevant token server (i.e., low value and high value token server 158), and forwards the authorization request message containing the high value token to the low value and high value token server 158.

At step S510, the low value and high value token server 158 receives the high value token and determines a low value token that is associated with the high value token. The low value and high value token server 158 may determine a low value token through any suitable method. For example, the low value and high value token server 158 may search a database for a low value token that has already been associated with the high value token, may generate a random low value token and associate the low value token with the high value token, may generate a low value token by applying a low value tokenization algorithm to the high value token, and/or may perform any number of additional methods of determining a low value token to associate with the high value tokens.

The low value and high value token server 158 may then update an associated tokens database with the relationship between the high value and low value tokens. In some embodiments, the relationships may be permanent such that once an association between a high value and low value token has been set, the low value token may be used as a substitute for any future uses of the high value token. In other embodiments, the association may be temporary or limited in nature.

The low value and high value token server 158 may update the authorization request message to include the low value token and may send the updated authorization request message to transaction processing computer 152 for further processing of the request at step S515. Accordingly, because the high value token has been substituted for a low value token and because the transaction processing computer 152 (as well as other applications associated with the transaction processing computer 152) do not have access to a low value token to high value token and/or low value token to real credentials mapping, the transaction processing computer 152 (as well as other internal applications/systems) are considered to be within a low value token buffer.

At step S520, the transaction processing computer 152 receives the updated authorization request message including the low value token and starts processing the authorization request message as a traditional payment transaction. For example, the transaction processing computer 152 may perform a number of processing steps to the authorization request message that includes a fraud risk analysis, loyalty program processing, and any other application system processing. Thus, the transaction processing computer 152 may send the updated authorization request message and/or generate a new request including the low value token to other internal and/or external systems for processing of the transaction request. However, the other applications and systems may use the low value token to perform the analysis and processing.

The transaction processing computer 152 receives the result of the various application processes and continues processing the transaction. The application processing responses include the low value token and do not include the associated high value token or the associated real credentials. Accordingly, the transaction processing computer 152 may determine that processing of the transaction request should continue and that an authorizing entity computer 160 outside of the transaction processing network should be approached for authorization of the authorization request message. The transaction processing computer 152 may send the authorization request message including the low value token and the results of the application processes completed in step S520 back to the low value and high value token server 158 at step S525 that may be configured to exchange the low value token for the real credentials. In some embodiments, instead of using the low value token to real credential mapping, the low value and high value token server 158 may exchange the low value token for a high value token and then exchange the high value token for real credentials.

At step S530, the low value and high value token server 158 receives the low value token from the transaction processing computer 152, determines real credentials associated with the low value token, and updates the authorization request message to include the real credentials. At step S535, the low value and high value token server 158 sends the authorization request message including the real credentials to an authorizing entity computer 160. At step S540, the authorizing entity computer 160 may determine whether to approve the transaction based on available funds, a risk analysis, etc. At step S545, the authorizing entity computer 160 may return an authorization response message to the low value and high value token server 158.

At step S550, the low value and high value token server 158 may obtain the high value token associated with the real credentials, and update the authorization response message to include the high value token instead of the real credentials. At step S570, the low value and high value token server 158 may send the response including the high value token to the transport computer 140. The transport computer 140 may forward the authorization response message to the resource provider computer 130 at step S571. At step S573, the response may be provided to the access device 120, which may, in some embodiments, provide the user with an indication of whether or not the transaction was authorized.

At the end of the day or at some other suitable period of time, a clearing and settlement process could occur between the transport computer 140, the transaction processing computer 152, and the authorizing entity computer 160. A similar or different message conversion protocol can be used.

Figure 6:
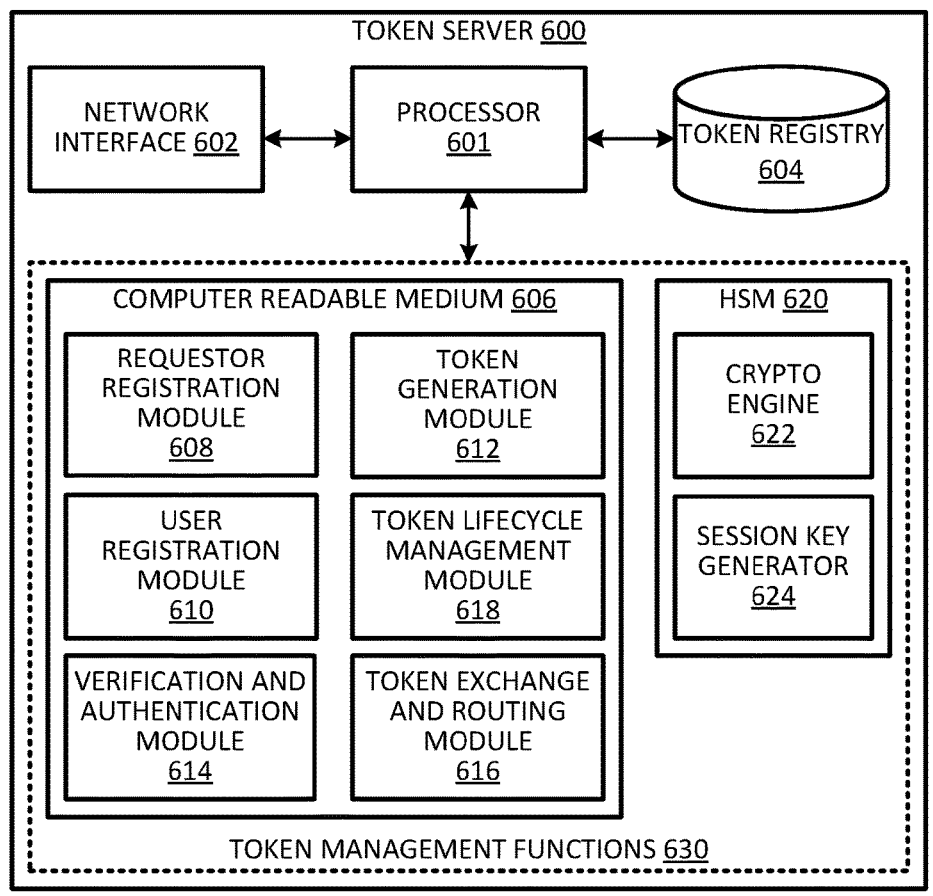
FIG. 6 shows a block diagram of a token server according to embodiments of the present invention.

FIG. 6 illustrates a block diagram of a token server 600 according to some embodiments of the present invention. Token server 600 may be used to implement, for example, low value token server 151, high value token server 156, and/or low value and high value token server 158, described above. In some embodiments, one or more token servers 600 can be used, for example, to implement a network token system. Token server 600 may include a processor 601 coupled to a network interface 602 and a computer readable medium 606. In some embodiments, token server 600 may also include a hardware security module (HSM) 620. Token server 600 may also include a token registry 604 that may be internal or external to token server 600.

Processor 601 may include one or more microprocessors to execute program components for performing the token management functions 630 of token server 600. Network interface 602 may be configured to connect to one or more communication networks to allow token server 600 to communicate with other entities such as a user device, a resource provider computer, a transport computer, a transaction processing computer, an authorizing entity computer, etc. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the token management functions 630 of token server 600 described herein. For example, computer readable medium 606 may include a requestor registration module 608, a user registration module 610, a token generation module 612, a verification and authentication module 614, a token exchange and routing module 616, and a token life-cycle management module 618.

Requestor registration module 608 may, in conjunction with processor 601, register a token requestor entity with the token registry 604, and to generate a token requestor identifier (ID) for the registered entity. Each registered entity can use their respective token requestor ID as part of a token service request to facilitate identification and validation of the entity. In some embodiments, a token requestor entity may provide token requestor information to the requestor registration module 608 such as an entity name, contact information, an entity type (e.g., resource provider, wallet provider, payment service provider, authorizing entity, payment enabler, acquirer, etc.). In some embodiments in which the token is transaction related, the token requestor information may also include token presentment modes (e.g., scan, contactless, e-commerce, etc.), token type (e.g., static/dynamic, payment/non-payment), integration and connectivity parameters, and services subscribed (e.g., token request, authentication and verification, life-cycle management, etc.) and any other relevant information for the onboarding process.

User registration module 610 may, in conjunction with processor 601, perform registration of users and accounts of the users. In some embodiments, token server 600 may, in conjunction with processor 601, allow authorized entities to register consumer accounts (e.g., payment or financial accounts) with the network token system on behalf of the users. For example, a registered token requestor may provide a token requestor ID (e.g., received at the time of registration from the requestor registration module 608), an real credential or other sensitive information or sensitive information identifier for which a token can substitute, a consumer name and contact information, device identifier of the user's device, a token type, and any other relevant information for individual account registration or bulk account registration. In some embodiments, user registration module 610 may store the account details and sensitive information in token registry 604 for all successful activation and registration requests. In some embodiment, an authorized entity may also unregister users and accounts by providing the necessary information to token server 600.

Token generation module 612 can be configured, in conjunction with processor 601, to generate a low value and/or high value token or retrieve sensitive information in response to processing a request for a token or sensitive information from a token requestor. In some embodiments, token generation module 612 may receive a token requestor ID and an account identifier or sensitive information identifier. In some embodiments, token generation module 612 may also receive optional information such as a user name, a user address and zip code, a requested token or sensitive information type (e.g., static, dynamic, non-payment, etc.), device identifier, and/or suitable information. In some embodiments, token generation module 612 may generate a response with the requested token or requested sensitive information, a token expiration date associated with the token, and/or a token assurance level associated with the token. In some embodiments, token generation module 612 may validate the token requestor ID and maintain the correlation between a high value token, a low value token, the sensitive information or real credential being substituted by the token, and/or the associated token requestor. In some embodiments, token generation module 612 may, in conjunction with processor 601, determine if a high value or low value token already exists in token registry 604 for a token request before generating a new token. In some embodiments, if a token cannot be provisioned, the token response may include a corresponding reason code. In some embodiments, token generation module 612 may also provide an interface to the token requestors to submit a bulk token request file.

In some embodiments, the high value token or low value token may be generated on the fly using API calls. For example, when a request is received to tokenize a real credential or other sensitive information, token generation module 612 may determine a token range to assign the token. The token range may be assigned based on whether the issuer is provisioning the token (e.g., issuer assigned token range) or the transaction processing network is provisioning the token on behalf of the issuer (e.g., transaction processing network assigned token range). As an example, if the transaction processing network assigned token range includes "442400000-442400250," then "4424000000005382" may be assigned as a token value. Token registry 604 may store the relationship of the token range to the account identifier, and a token add record may be logged. In some embodiments, token generation module 612 may consider the token range list associated with the account identifier range before assigning a token.

Verification and authentication module 614 may be configured to execute a consumer verification and authentication process, and determine a token assurance level based on the outcome of the verification and authentication process. For example, the verification and authentication module 614 can perform consumer authentication and verification through a configured authentication scheme. In some embodiments, the authentication scheme may include verification of the real credential, verification values, and the expiration date based on the customer information stored in a database associated with the transaction processing network. In some embodiments, the authentication scheme may include direct verification of the consumer by the authorizing entity using consumer credentials for their online banking system.

In some embodiment, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give authorizing entities the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the consumer on-behalf of the authorizing entity prior to the authorization process.

In some embodiments, user registration, token generation, and verification and authentication may be performed as part of processing a single token request process. In some embodiments, for bulk requests, user registration and token generation may be performed by processing a bulk file from the token requestor. In such embodiments, consumer verification and authentication may be performed in a separate step. In some embodiments, the token requestor can request that the authentication and verification process be performed independently multiple times for a particular account to reflect any changes to the levels of assurance for the token over time.

Token exchange and routing module 616 may, in conjunction with processor 601, process requests for the underlying sensitive information (e.g., a real credential) associated with a given token. For example, the transaction processing network, acquirer, authorizing entity, etc. may issue a request for a token exchange during processing of a transaction. Token exchange and routing module 616 may, in conjunction with processor 601, validate that the requesting entity is entitled to make a request for a token exchange. In some embodiments, token exchange and routing module 616 may, in conjunction with processor 601, validate the real credential (or other sensitive information) to token mapping and presentment mode based on the transaction timestamp and the token expiration timestamp. Token exchange and routing module 616 may, in conjunction with processor 601, retrieve the real credential (or other sensitive information) from token registry 604, and provide it along with the assurance level to the requesting entity. In some embodiments, if the real credential (or other sensitive information) to token mapping is not valid for the transaction timestamp and presentment mode, an error message may be provided.

Token life-cycle management module 618 may, in conjunction with processor 601, perform life-cycle operations on the tokens managed by token server 600. Life-cycle operations may include canceling a token, activating or deactivating a token, updating token attributes, renewing token with a new expiration date, etc. In some embodiments, a token requestor entity may provide a token requestor ID, a token number, a life-cycle operation identifier and one or more token attributes to token server 600 to perform the requested life-cycle operation on a given token. Token life-cycle management module 618 may, in conjunction with processor 601, verify the token requestor ID and the token association based on information in token registry 604. Token life-cycle management module 618 may perform the requested life-cycle operation on a given token, and update the corresponding associations in token registry 604. Examples of life-cycle operation may include a token activation operation to activate an inactive, suspended, or temporarily locked token and its associations; a token deactivation operation to temporarily lock or suspend a token; a cancel token operation to permanently mark a token and its associations as deleted to prevent any future transactions, etc. In some embodiments, a deleted token may be used during returns/chargebacks if the same token was used to submit the corresponding original transactions.

According to some embodiments, token server 600 may include a HSM 620 to perform secure functions such as encryption and decryption operations and generation of cryptographic keys used for the encryption and decryption operations. For example, HSM 620 may include a cryptography engine 622 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 620 may also implement a session key generator 624 to generate a session key for each token or sensitive information request that token server 600 processes. The generated session key can be used to encrypt a token or sensitive information generated or retrieved for the request, and the token or sensitive information can be provided to the token requestor in an encrypted form. For example, for each request that token server 600 receives and processes, session key generator 624 may generate a session key that can be unique for each request received from the particular token requestor, or unique to each request associate with a particular user or account. In some embodiments, the session key can be the same or different than the encryption key that is used to establish the secure communication channel (e.g., TLS, SSL, etc.) between the token requestor and token server 600. Token generation module 612 may, in conjunction with processor 601, generate or otherwise retrieve a token or sensitive information to fulfill the request. The session key can be used by cryptography engine 622 to encrypt that token or sensitive information using an encryption algorithm, and the encrypted token or sensitive information can be provided to the token requestor. In some embodiments, the generated session key is also provided to the token requestor with the encrypted token or sensitive information.

Although token server 600 has been described with a HSM implementing only some of their functions, it should be understood that other functionalities of the respective computers (e.g., token generation) can be implemented inside a HSM as well. Furthermore, some or all of the respective HSM functionalities can also be implemented outside of a HSM.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a first server computer, a request message including a first token from an access device, the first token being a substitute for a real credential, the first token being configured to be processed by the access device to conduct a transaction;
determining, by the first server computer, a second token associated with the first token, the second token not being configured to be processed by the access device to conduct the transaction;
updating, by the first server computer, the request message to include the second token; and
sending, by the first server computer, the request message including the second token to a second server computer, the second server computer using the second token to either obtain the first token or the real credential to incorporate into the request message before transmitting the request message to an authorizing entity computer.

2. The method of claim 1, further comprising:
receiving, by the first server computer, a response message including the second token from the second server computer;
determining, by the first server computer, the first token associated with the second token;
updating, by the first server computer, the response message to include the first token; and
sending, by the first server computer to the access device, the response message including the first token.

3. The method of claim 2, wherein the second server computer receives the response message from the authorizing entity computer, and wherein the second server computer incorporates the second token into the response message before transmitting the response message to the first server computer.

4. The method of claim 2, wherein the request message is an authorization request message and the response message is an authorization response message.

5. The method of claim 1, wherein the real credential comprises an account identifier.

6. The method of claim 1, wherein the second server computer uses the second token to perform at least one of risk analysis and application system processing.

7. The method of claim 1, wherein receiving the request message by the first server computer from the access device occurs via at least one of a resource provider computer and a transport computer.

8. A first server computer comprising:
a processor; and
a memory comprising code, executable by the processor, for implementing a method comprising:
receiving a request message including a first token from an access device, the first token being a substitute for a real credential, the first token being configured to be processed by the access device to conduct a transaction;
determining a second token associated with the first token, the second token not being configured to be processed by the access device to conduct the transaction;
updating the request message to include the second token; and
sending the request message including the second token to a second server computer, the second server computer using the second token to either obtain the first token or the real credential to incorporate into the request message before transmitting the request message to an authorizing entity computer.

9. The first server computer of claim 8, wherein the method further comprises:
receiving a response message including the second token from the second server computer;
determining the first token associated with the second token;
updating the response message to include the first token; and
sending, to the access device, the response message including the first token.

10. The first server computer of claim 9, wherein the second server computer receives the response message from the authorizing entity computer, and wherein the second server computer incorporates the second token into the response message before transmitting the response message to the first server computer.

11. The first server computer of claim 9, wherein the request message is an authorization request message and the response message is an authorization response message.

12. The first server computer of claim 8, wherein the real credential comprises an account identifier.

13. The first server computer of claim 8, wherein the second server computer uses the second token to perform at least one of risk analysis and application system processing.

14. The first server computer of claim 8, wherein receiving the request message by the first server computer from the access device occurs via at least one of a resource provider computer and a transport computer.

15. A method comprising:
receiving, by a server computer, a request message including a first token from an access device, the first token being a substitute for a real credential, the first token being configured to be processed by the access device to conduct a transaction;
determining, by the server computer, a second token associated with the first token, the second token not being configured to be processed by the access device to conduct the transaction;
sending, by the server computer, the second token to an application system, wherein the application system performs analysis using the second token;
receiving, by the server computer, the second token and results of the analysis from the application system;
determining, by the server computer, the real credential using the second token;
updating, by the server computer, the request message to include the real credential; and
sending, by the server computer, the request message including the real credential to an authorizing entity computer.

16. The method of claim 15, further comprising:
receiving, by the server computer, a response message including the real credential;
determining, by the server computer, the first token associated with the real credential;

updating, by the server computer, the response message to include the first token; and sending, by the server computer, the response message including the first token.

* * * * *